United States Patent Office 2,704,947
Patented Mar. 29, 1955

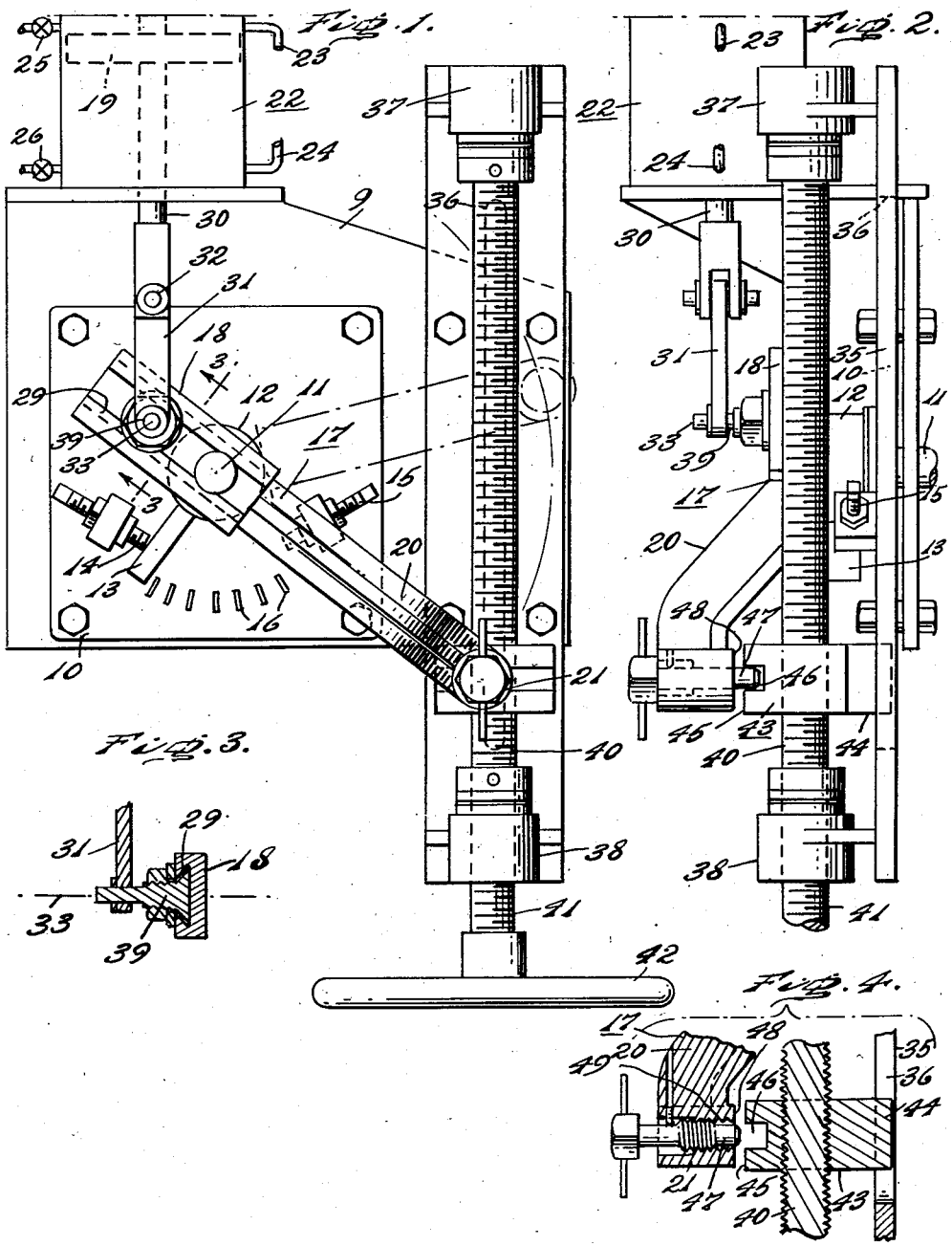

2,704,947

MANUAL AND AUTOMATIC VALVE ACTUATOR WITH DECLUTCHING UNIT

David Walter Hopkins, Philadelphia, Pa., assignor to S. Morgan Smith Company, York, Pa., a corporation of Pennsylvania Application April 30, 1953, Serial No. 352,252

4 Claims. (Cl. 74—625)

This invention relates to declutching units for valve operators.

There are many situations in which valves, such as butterfly valves, are power operated, but in which, from time to time it is necessary to disconnect the power operator and to engage a hand operated mechanism. Such a device is shown, for instance, in the Hopkins Patent No. 2,390,882, of December 11, 1945. While this patented device is of utility, it, as well as all other prior art devices known to applicant, is possessed of certain disadvantageous features which it is desired to obviate. In most of the declutching devices now in use, for instance, both the power drive and the hand drive are through relatively small gears concentric with the shaft of the valve to be turned, and owing to the small lever arm involved require greater power than is easily developed in the hand operated power mechanism. Owing to the congestion of parts and the location of the manual power unit, operating close to the axis of the shaft of the valve, accessibility and simplicity are sacrificed.

It is among the objects of this invention to overcome the defects of prior art valve operators; to improve valve-operating mechanism; to provide a declutching unit for alternate mechanical and manual power applications to a valve shaft, each of which in space is clear of the other; to provide a simplified valve-operating device of the air motor operated type in which an air motor actuates one end of a lever of the first class mounted on the valve shaft, while the other end of the lever swings in an arc, of which a manually actuated threaded shaft is substantially a chord, with a slotted threaded follower adjustable on the threaded shaft by manual rotations of the latter, with movable means on the said other end for mounting in, or withdrawal from said slot, whereby venting or bleeding the power cylinder permits manual actuation of the valve-operating lever and thus of the valve; and to provide other advantages and improvements as will be apparent as the description proceeds.

In the accompanying drawings forming part of this description:

Fig. 1 represents a fragmentary plan of an illustrative embodiment of the invention.

Fig. 2 represents a fragmentary side elevation thereof.

Fig. 3 represents a fragmentary side section, taken on line 3—3 of Fig. 1.

Fig. 4 represents a fragmentary section of the lever end and adjustable pin thereon, and the slotted follower on the manual shaft.

The valve to be controlled is illustratively of the butterfly type, mounted in a housing 9, as is conventional, upon which is supported a mounting plate 10 for removable mounting on the valve housing, and suitably apertured as to receive the outer projecting end 11 of the vane shaft of the valve. The shaft 11 mounts a bushing 12 keyed to the shaft and having a radial fin 13 movable between adjustable stops 14 and 15 on the operating plate. Fin 13 has an arcuate path of oscillation with reference to graduations 16 on the plate so that the relative angular position of the shaft, and therefore of the vane of the valve, can be determined.

The outer end of the bushing 12 mounts a lever 17 of the first class, having a relatively short end 18, and a relatively longer end 20. If desired, the longer end may be bent up out of the plane of the remainder of the lever so that the lower surface of the outer free end 21 thereof lies and swings in a plane parallel to the plane of motion of the lever end 18, but spaced therefrom axially of the shaft 11.

The mounting plate 10 or the housing 9 mounts an air motor cylinder 22, comprising a piston or like device 19 in a working cylinder, and the working stroke of which is controlled by fluid-pressure power conduits 23 and 24, as is conventional. That is, when the air pressure enters one conduit, the other conduit is connected to exhaust, and vice versa. As an added feature, the cylinder 22 has bleed or vent valves 25 and 26, whereby, manually, both ends of the cylinder can be vented to permit free motion of the piston 19 by the manual actuation to be described. The working piston 19 is connected to a connecting rod 30, to which latter a link 31 is pivoted as at 32, and the other end of the link is pivoted at 33 to the short end 18 of the lever 17. Preferably the lever end 18 is slotted as at 29 and the pivot 33 is a clamping member 39 adjustable radially of the axis of shaft 11, as shown in Fig. 3. It will be seen that through the linkage described power can be supplied to lever end 18 to force the lever in both directions, to the end of the stroke determined by the vane position and by the adjustable stops 14 and 15. It will be observed that the leverage effected by power actuation of piston 19 is variable with adjustments of pivot 33. Power application to the lever 17 will cause the axis of a connecting pin 47 in the free end 21 of the longer lever arm, to be described, to swing in an arc about the axis of the valve shaft 11 as indicated in dash and dot lines on Fig. 1.

A supplemental supporting plate 35, which may be integral with or mounted on the plate 10, is provided in general alignment with plate 10, and has an elongated relatively narrow slot 36 formed therein. Toward the end of the plate 35, thrust bearing journals 37 and 38 are mounted, in which a threaded shaft 40 is journalled, with an extension 41 extending beyond one of the journals to mount a hand wheel or the like 42. Rotation of hand wheel 42 rotates the threaded shaft 40. The axis of the shaft 40 is parallel to, and spaced from, the slot 36 in the plate 35.

It will be observed that the shaft 40 and its mounting plate are so disposed that the shaft forms a chord of the arcuate path of motion of the pin 47 in free end 21 of the long arm 20 of the lever 17.

The threaded shaft mounts an internally threaded jockey or follower 43 of special shape and characteristics. The jockey has a depending guide fin or the like 44 disposed and guided in the slot 36. Its outer portion terminates in a generally planar surface 45, containing an elongated open slot or groove 46 transverse of the shaft 40.

The free end 21 of arm 20 mounts a manually controlled and adjusted pin 47. Threaded pin 47 is mounted in a threaded bore 49 in the free end 21 of the lever arm 20, for extension and retraction relative to a generally planar surface 48 on the end 21 of the lever. In retraction the inner planar surface 48 of the lever moves in a plane with lever movement, which is spaced from the plane of the surface 45 of the follower 43. The threaded pin 47 is of such length and diameter as to be extensible into the groove or open slot 46 in the follower to lock the lever and follower together. The important thing in the organization is that the pin 47 be extensible into the slot, or retractable to clear the surface 45, under the control of the operator.

In operation, with the pin 47 retracted, and the bleed or venting valves 25 and 26 closed, the valve is responsive in control to the selective pressure supply to the cylinder 22. When, for any reason, it is necessary or desirable to use the manual control, the venting valves 25 and 26 are opened, the hand wheel 42 is rotated to bring the follower 43 generally under the free end 21 of the longer end of the lever 17, and by proper manipulations of the pin 47 the latter is moved into the slot 46 of the follower 43, and thereafter manual positioning of the shaft 11 is accomplished by rotations of the hand wheel 42.

During hand wheel operation, by which, with rotations of the shaft 40, the follower 43 has been progressed axially of the shaft 40, the lever 17 has been moved, due to the positioning of the pin 47 in the slot 46, but due to the relation of the axis of shaft 11 to the axis of threaded shaft 40, there is motion of pin 47 along the slot or groove 46, as well as in bodily translation with the follower 43. Thus the entire lever organization is moved and the vane of the valve mounted on the shaft 11 is manually repositioned and set.

The simplicity and efficiency of the invention will be apparent.

Having thus described my invention, I claim:

1. In a valve operator, a fluid pressure motor, a lever having an end coupled to and movable by said motor, a pin mounted on said lever and movable in an arc with said lever, a threaded shaft having an axis forming a chord with the arc of movement of said pin, a threaded follower mounted on said shaft for movement along said chord, said follower having a groove normal to the axis of said shaft, means for moving said pin between positions in said groove and out of contact with said groove, means for venting said fluid pressure motor, and means for rotating said shaft whereby with the pin retracted from said groove and the vents closed said motor actuates said lever, and with the motor vented and the pin engaging in said groove the lever movement is effected by rotation of said threaded shaft during which the pin travels longitudinally in said groove.

2. In a valve operator for oscillatable valves having a valve shaft, a lever engaged with such shaft and extending in two directions substantially radially of the axis of such valve shaft, a fluid pressure motor, means coupling the motor permanently to one end of said lever whereby with motor actuation the other end of the lever on the other side of the axis of said shaft traverses an arc, a threaded shaft having an axis forming a chord with such arc, a follower threaded on the threaded shaft having a surface facing toward said other end of the lever, said surface having a groove extending substantially transverse of the axis of said threaded shaft, pin means adjustable between disposition in said groove and a position out of said groove, whereby with the pin means engaged in said groove the lever is swung about the axis of such valve shaft with rotations of said threaded shaft, manual means for rotating said threaded shaft, and means for venting said motor.

3. In a valve operator for butterfly valves having a shaft of vane operation, supporting means, a fluid power motor mounted on said means, means supplying power to said motor to actuate same through power strokes, venting means operative to permit motion of the motor by extraneous force without appreciable back pressure on the force, a lever mounted on said vane shaft intermediate its ends, means connecting one end of the lever to said motor for actuation by and with said motor whereby the other end of said lever describes an arc in space, a manually actuated threaded shaft forming a chord with the said arc, a follower threaded on said threaded shaft for progressive movement along said chord with rotations of said shaft, complemental means on said follower and said other end of said lever for temporarily engaging the lever and follower whereby upon venting of the motor the lever can be manually oscillated by rotations of the shaft, said complemental means effecting coupled engagement between the follower and said other lever end in all positions of the latter along its arcuate path of movement.

4. In a valve operator, a support, a shaft extending from the support, a level of the first class mounted intermediate its ends on said shaft, an air motor, means for supplying pressure for actuating the motor in both directions, means for venting the air motor, means coupling the air motor to one end of said lever, a mounting plate having a guide groove and supported on said housing, a threaded shaft journalled on said plate and having an axis forming a chord with the arc of movement of the other end of said lever, said axis being parallel to said guide groove, a follower threaded on said shaft having a guide element disposed in said guide groove, said follower having a surface facing and juxtaposed to but spaced from the plane of movement of said other end of the lever, said follower having a surface groove extending transversely of said guide groove and of the axis of said shaft, a pin mounted in said other end of said lever and movable between disposition in said surface groove and out of said surface groove, whereby when retracted from said groove the said other lever end can swing out of contact with said follower when the lever is motor actuated, and whereby upon venting of the motor and engagement of said pin in said surface groove the lever can be manually actuated by rotations of said shaft.

References Cited in the file of this patent

UNITED STATES PATENTS

| 1,742,892 | Belcher | Jan. 7, 1930 |
| 2,390,882 | Hopkins | Dec. 11, 1945 |

FOREIGN PATENTS

| 3,699 | Great Britain | Feb. 26, 1900 |